Figure 6:
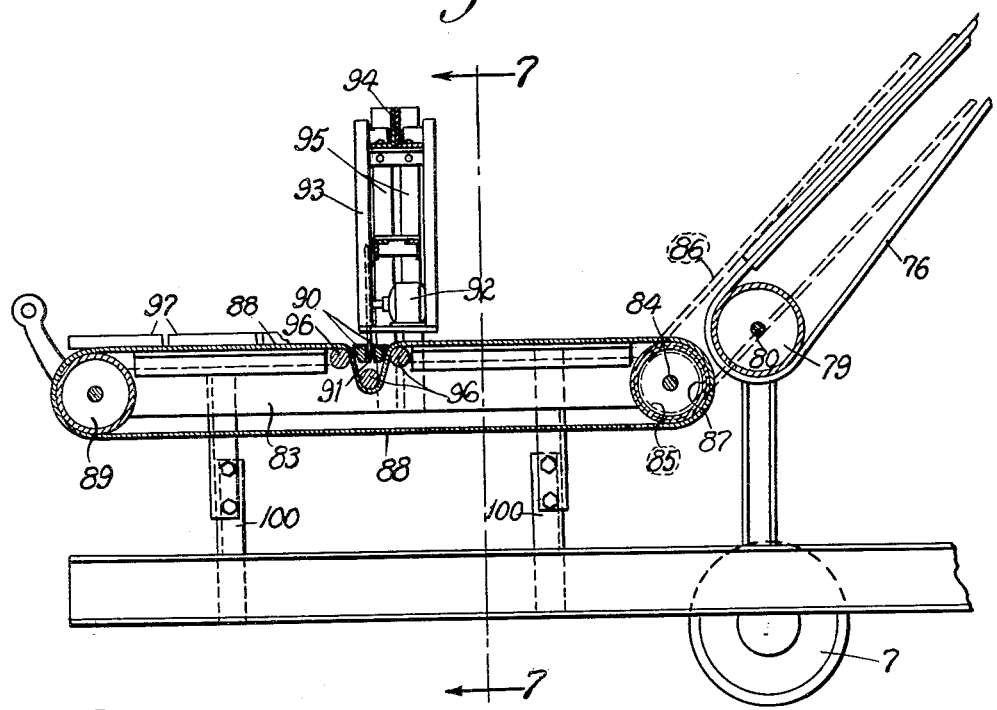

June 27, 1933. O. F. MOTTWEILER 1,916,011
APPARATUS FOR AND METHOD OF MANUFACTURING
INSULATING MATERIAL FROM MINERAL WOOL
Filed July 19, 1930 5 Sheets-Sheet 1
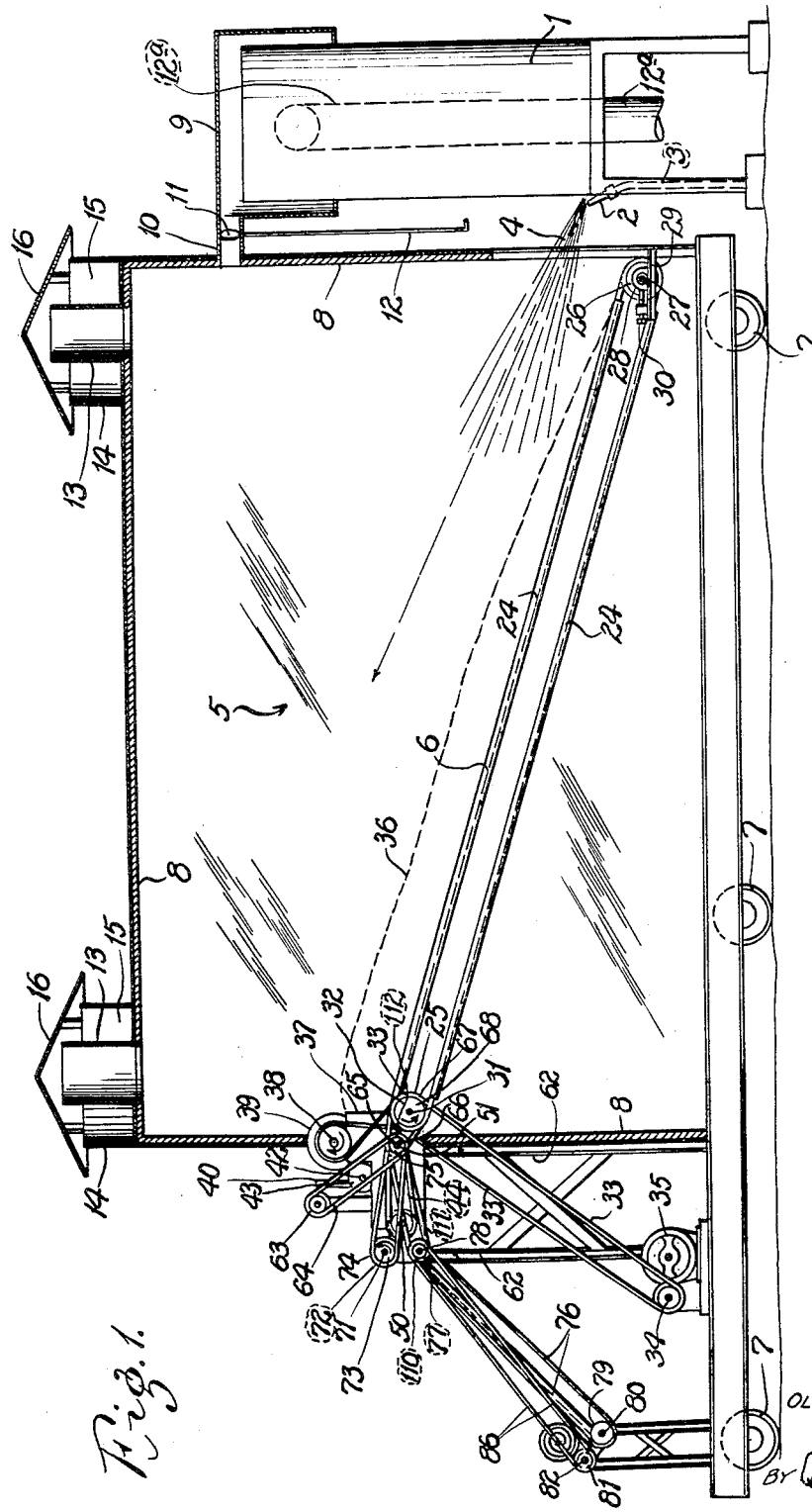
INVENTOR:
OLIVER F. MOTTWEILER
By Bruce S. Elliott
ATTORNEY.

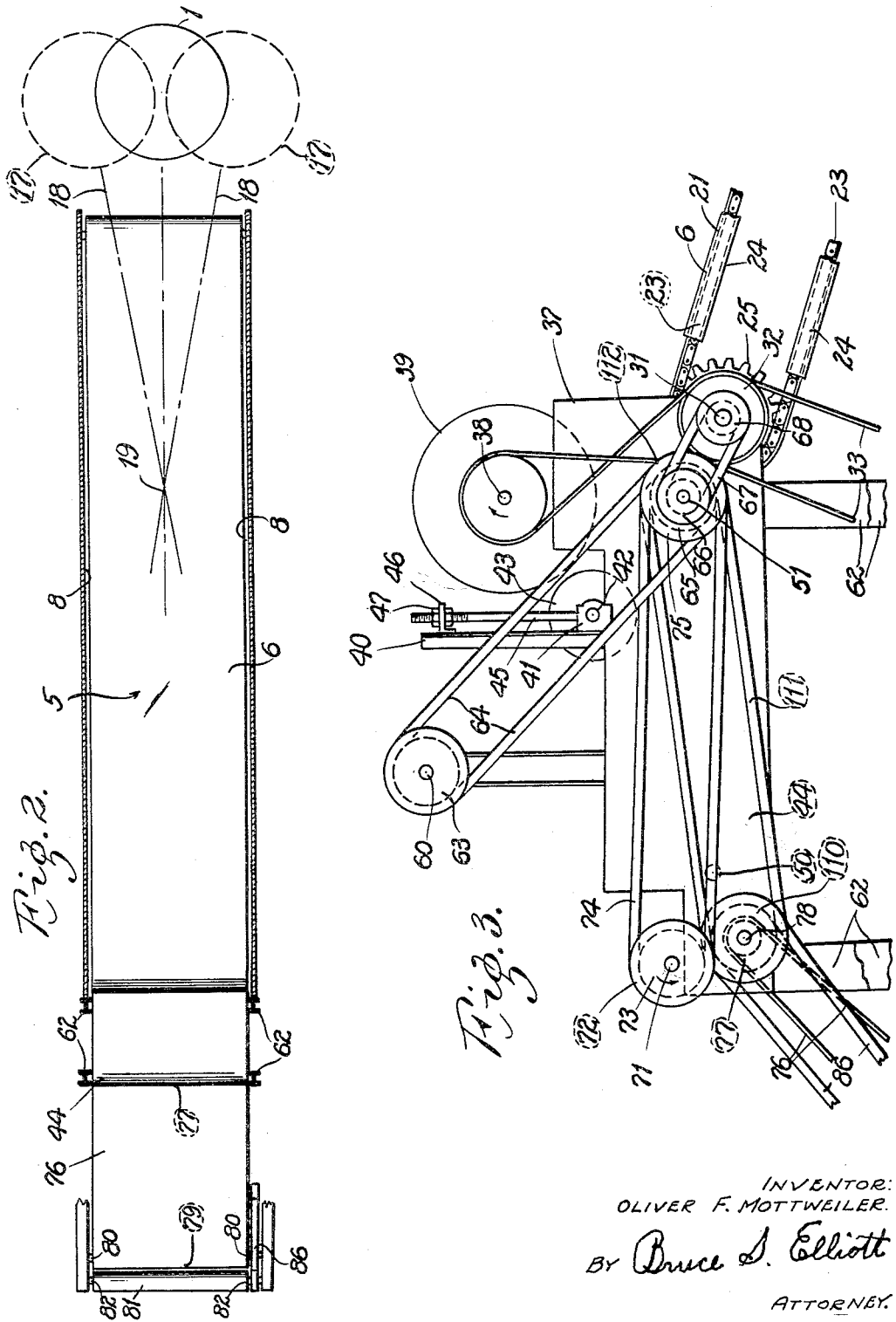

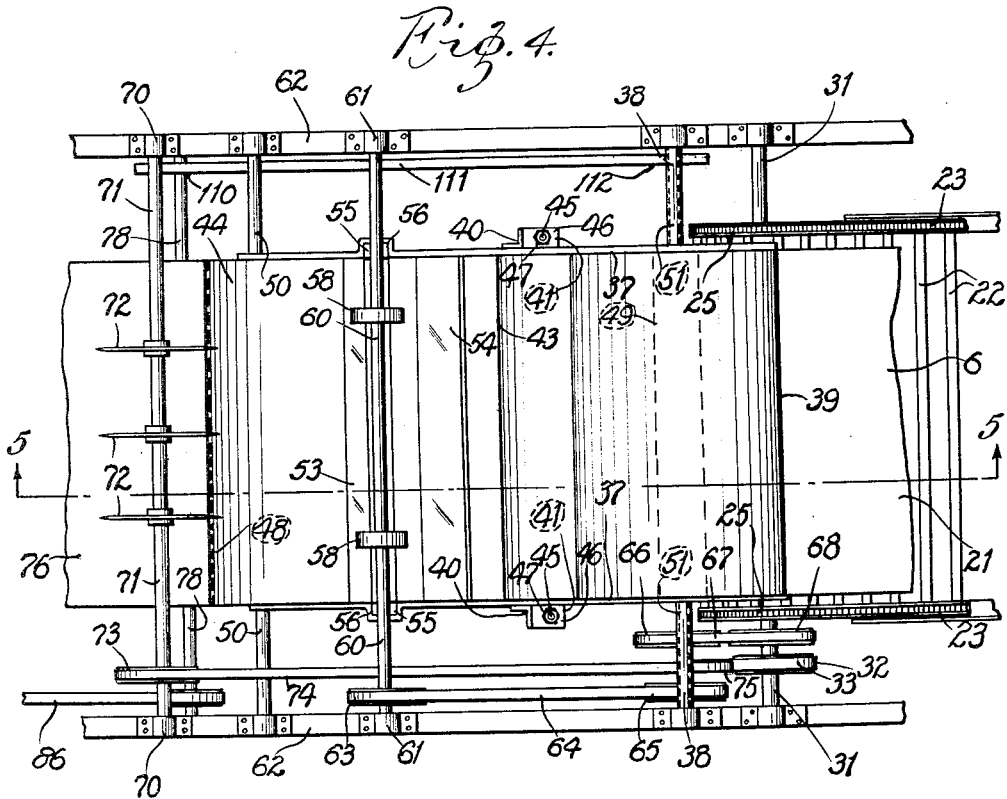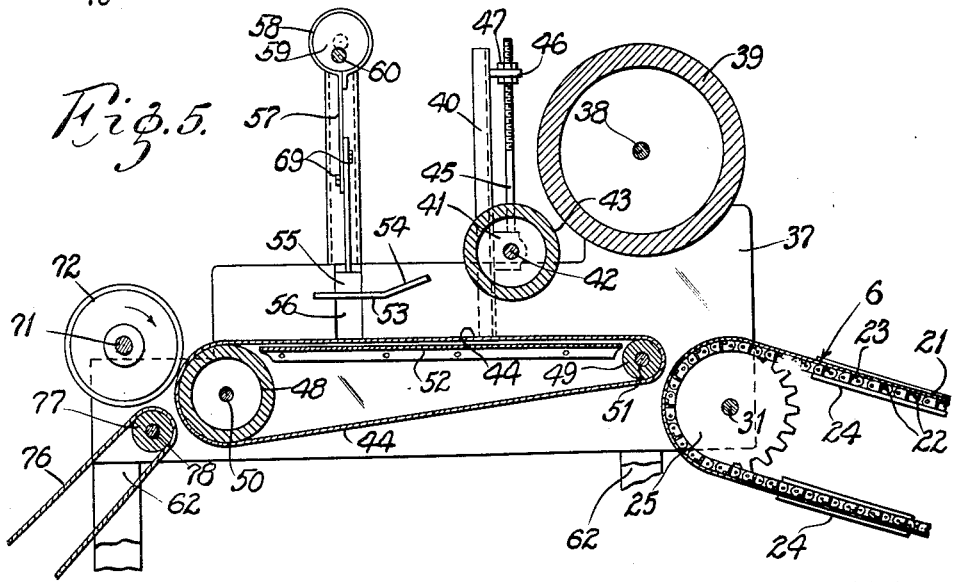

INVENTOR:
OLIVER F. MOTTWEILER.
BY Bruce S. Elliott
ATTORNEY.

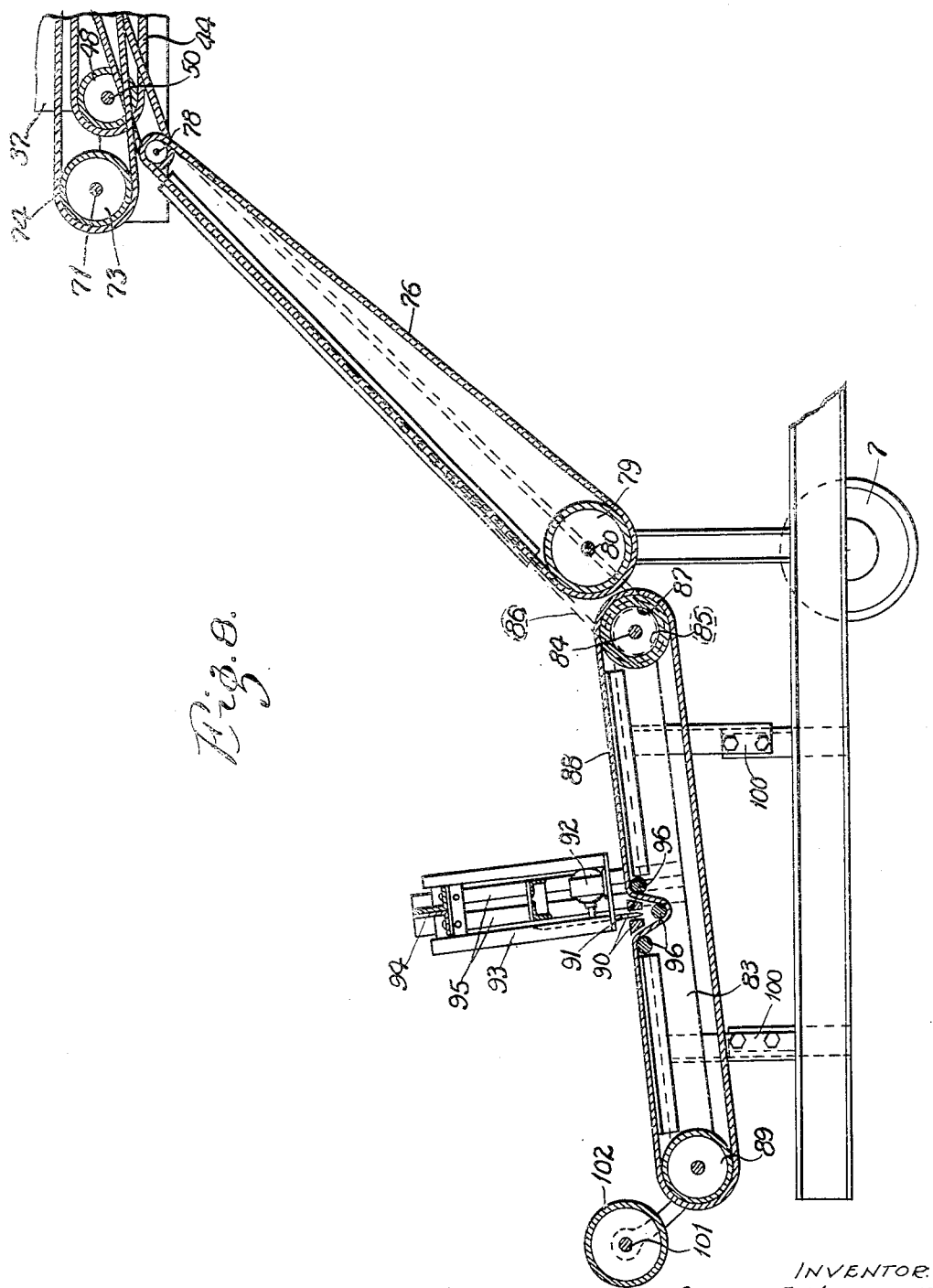

Patented June 27, 1933

1,916,011

UNITED STATES PATENT OFFICE

OLIVER F. MOTTWEILER, OF ALEXANDRIA, INDIANA, ASSIGNOR TO GENERAL INSULATING & MANUFACTURING COMPANY, OF ALEXANDRIA, INDIANA, A CORPORATION OF INDIANA

APPARATUS FOR AND METHOD OF MANUFACTURING INSULATING MATERIAL FROM MINERAL WOOL

Application filed July 19, 1930. Serial No. 469,074.

This invention relates to certain new and useful improvements in apparatus for and method of manufacturing insulating material from rock, mineral, or slag wool, and which I will hereafter refer to, for the sake of brevity, as mineral wool.

The objects of this invention are to enable mineral wool to be automatically gathered in sheet form in the blowing chamber, and in continuation of the process of forming the mineral wool fibres, and to felt such sheets to any thickness desired; to provide means for cutting the felted sheet into one or more strips of a desired width; to provide means for automatically rolling the felted sheets, or strips, of insulating material into cylindrical form; to provide means for cutting the felted sheet transversely into slabs of any desired length; to provide means for automatically packing or compressing the sheet of mineral wool after it has been reduced to the thickness desired; to provide novel means for continuously collecting in sheet form, reducing to uniform thickness and removing from the blowing chamber, mineral wool fibres blown into said chamber; to provide a novel blowing chamber, which may be either stationary or portable; to provide means for regulating the temperature and moisture in the blowing chamber; to provide means for properly ventilating the blowing chamber whereby to maintain a uniform pressure of air within said chamber to permit the fibrous material to fall in place while in the long fibre condition; to provide a plurality of novel power driven means for gathering and placing in compact sheet form mineral wool blown into a chamber, one of said means comprising an endless gathering and conveying belt, located within the blowing chamber, for receiving the mineral wool fibres blown into said chamber, and to operate all of said means synchronously from a variable speed transmission device whereby, according to the thickness of the sheet, or layer of fibres desired to be deposited on said gathering belt, the speed thereof may be increased, or diminished, and all of the parts co-operating therewith will be simultaneously regulated as to speed.

There are numerous other objects of the invention, involving novel constructions, combinations and operations of parts, all of which will be more clearly understood from the detailed description of the invention to follow:

In the drawings:—

Figure 7:
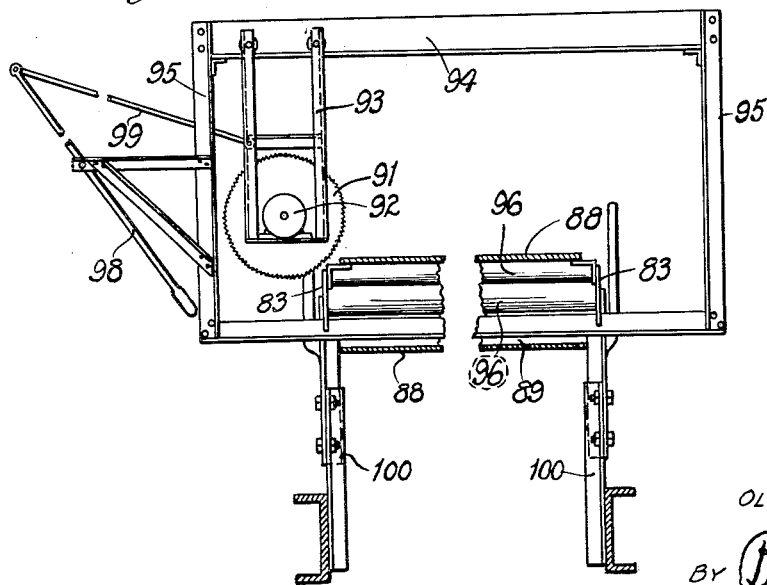

Fig. 1 is a side view of a blowing chamber showing my improvements associated therewith, the side wall of the chamber being removed; Fig. 2 is a sectional plan view of the same; Fig. 3 is a view in side elevation on an enlarged scale showing a portion of the driving mechanism illustrated in Fig. 1; Fig. 4 is a plan view of the parts shown in Fig. 3; Fig. 5 is a section on the line 5—5 of Fig. 4; Fig. 6 is a longitudinal sectional view of a traveling table showing a cutting mechanism associated therewith; Fig. 7 is a section on the line 7—7 of Fig. 6; Fig. 8 is a view similar to Fig. 6; but showing the traveling table in an inclined position and a roll-up roller associated therewith.

Referring now to the drawings, the numeral 1, Fig. 1, indicates a cupola in which the slag, or rock, from which the mineral wool is to be formed, is designed to be melted, in the usual way. At the bottom of this cupola is an aperture through which the molten material is adapted to flow, and directly beneath such openings is a jet 2 connected with a steam pipe 3, which, by a blast of steam at high pressure issuing from said jet, is adapted to shred the molten mass, as indicated at 4, and to blow it into a blowing chamber 5. The steam issuing from jet 2 may have oil or any other suitable treating agent mixed therewith, in the manner fully described in the pending application of Mottweiler and Drill, Ser. No. 235,555, filed November 25, 1927. According to my invention, the mineral wool fibres thus blown into chamber 5 are adapted to be deposited on an endless, upwardly inclined gathering belt 6, and as an amount of fibres are continuously blown into the chamber in practically a uniform volume and to a uniform distance, the fibres will be deposited to a substantially uniform thickness on the gathering belt, and the thickness of the deposited fibres may be regulated by varying the speed of movement of the belt; that is, to say, the belt operates to continuously remove the collected fibres from the blowing chamber, and the faster it moves the less the thickness of the layer of fibres deposited thereon, and conversely as the speed of movement of the belt is made slower, the thickness of the layer of deposited fibres will increase.

One of the features of my invention is to decrease the size of the plant for producing mineral wool, and to cheapen the cost of manufacture thereof. In ordinary practice two blowing chambers are required for each cupola, and each blowing chamber is usually twenty feet wide, eighty feet long and twenty feet high. These blowing chambers, of course, are used in alternation; that is to say, when the mineral wool to the desired amount has been blown into one chamber, the blast is turned into the adjacent chamber while the mineral wool is being removed from the first chamber. According to my invention, I use a blowing chamber which in practice is only six feet wide by about sixty feet in length and twenty feet in height and, as shown, the same may be mounted on wheels, or rollers, 7 to enable it to be moved to desired localities, or to enable it simply to be shifted from its position in front of one cupola to a position in front of an adjacent cupola, or cupolas. The gathering belt 6 extends from side to side of the blowing chamber 5, so that all of the mineral wool projected into said chamber by the blast of steam falls onto said belt and is thereby continuously removed from the chamber. By operating in this manner one blowing chamber, of substantially the dimensions named above, can be arranged to receive the output from two cupolas, whereas in the installations now generally in use four blowing chambers of the size mentioned would be required to handle the output of two such cupolas.

In order to maintain a uniform temperature within the blowing chamber 5, all the walls of said chamber are lined with suitable insulating material, as indicated at 8.

One of the features of my invention consists in utilizing the heat from the cupola to heat the blowing chamber and prevent condensation of moisture, and to produce a regulated temperature therein of the degree that is best suited to mature the fibres blown into the chamber. To this end I surround the upper part of the cupola 1 with a drum 9, having a pipe 10, entering the blowing chamber 5 through the front wall at a point substantially midway between the center and the top thereof. The amount of heat required in the blowing chamber will, of course, vary according to the temperature on the outside, and in order to regulate the amount of heat passing into the blowing chamber, I mount in pipe 10 a damper 11, having a depending handle 12 for operating. A pipe 12 usually leads from the upper part of cupola to near the ground, or floor, to provide a means of escape for fine particles blown to the top of the furnace by the blast.

In order to ventilate the blowing chamber 5, I provide on the top thereof, near either end, a flue 13 surrounded at a distance therefrom by wall 14, forming a chamber 15 for collecting fluff wool passing out of the flue 13, and over the top of each flue I mount at a distance therefrom a hood 16. By the provision of the flue 13 and the dampered pipe 10 for admitting heat into chamber 5, I can maintain a uniform temperature within said chamber, carry away any moisture therein and prevent the building up of pressure within said blowing chamber by the action of the steam blast. This latter feature is quite important as it permits the long mineral wool fibres to fall in place on the gathering belt while, without the ventilating means, a great many of the fibres are picked up by the blast and torn, or broken, into small pieces while in suspension in the air. Long mineral wool fibres, it should be stated, make a strong and more uniform insulating material than the shorter fibres.

By reason of the greater capacity of my improved blowing chamber, I am enabled to utilize one such chamber to accommodate the output from two cupolas, simultaneously operated. This arrangement is shown in Fig. 2 wherein two cupolas 17 are shown positioned in front of the blowing chamber 5 and the blast from each cupola is directed at an angle into the front of the blowing chamber, as indicated by the lines 18, the direction of the blast being such that they meet at a common zone 19 within the chamber. Not only am I thus enabled to greatly increase the capacity of the plant, but I thereby am enabled to produce insulating material from mineral wool by an entirely novel method, consisting in bringing the shredded material from the two cupolas together while moving in converging lines, whereby the fibres are caused to meet and interlock with each other before being deposited on the belt 6 so that a much stronger and more homogeneous mat, or layer, of material is produced than where the fibres are simply deposited in superposed relation on the belt.

As shown by Fig. 5, the belt 6 is preferably formed by mounting an endless strip of meshed wire, or other suitable material, 21 on a series of transverse angle bars 22, which are secured at their ends to the links of sprocket chains 23, which are guided by channel bars 24 and each chain passes at its upper end over a sprocket wheel 25. At its lower end the sprocket chains 23 pass over sprocket wheels 26, Fig. 1, which are mounted on a shaft 27, supported in bearings 28, each of which is slidably mounted on a support 29, and which bearings are adjustable to tighten the belt by means of set screws 30. The sprockets 25 at the upper end of belt 6 are mounted on a shaft 31, Figs. 4 and 5, and on this shaft is a pulley 32 which is driven by belt 33 from a variable speed transmission device 34, operated from a motor 35. According to my invention, the mineral wool deposited in a layer of practically uniform depth on the belt 6, as indicated in the dotted lines, Fig. 1, by the numeral 36, is adapted to be automatically compressed to the desired thickness in a continuous operation, and this arrangement will now be described.

At the upper end of belt 6 I provide a frame 37, Fig. 5, on which is supported a shaft 38, having secured thereon a relatively large roller located at a suitable distance above the upper end of belt 6. To the rear of roller 39 I mount on frame 37 vertical guides 40, in which are slidably mounted bearings 41 supporting a shaft 42, on which is secured a roller 43 of considerably less diameter than the roller 39, and located immediately to the rear thereof. The roller 43 normally occupies a lower position than the roller 39 and is adapted to be adjusted toward and from an endless belt 44 located directly beneath it by means of vertical rods 45 extending upward from bearings 41 through brackets 46, mounted near the upper ends of guides 40. The upper portions of rods 45 are screw threaded and lock nuts 47 are mounted on the rods on opposite sides of each of the brackets 46, by loosening one of these nuts and turning up the other the rods 45 can be raised or lowered and locked in adjusted positions, as will be understood. The belt 44 is mounted at its opposite ends on pulleys 48—49, respectively, the pulley 48 having a shaft 50, and the pulley 49 a shaft 51. Located under belt 44 and extending between the pulleys 48—49 is a flat support 52, over the upper surface of which the belt 44 moves, and which, by supporting the belt, enables the mineral wool to be compressed to a desired thickness as it passes under roller 43. The roller 39 constitutes a primary packing or compressing roller, and, as the layer of mineral wool 36, which will be in a loose, fluffy mass, is passed under roller 39, it is engaged by said roller and reduced in thickness. It next passes under roller 43 which operates to still further reduce the thickness of the layer, the degree of thickness produced by causing the layer of mineral wool to pass between roller 43 and belt 44 being regulated, as described, by adjusting roller 43 toward or from said belt.

Another feature of the invention consists in packing the layer of mineral wood as it is moved from under roller 43 by belt 44. To this end I mount on frame 37 a tamper 53 which extends transversely of belt 44 and is in the form of a flat metal plate having an upwardly inclined end 54 to facilitate the entrance of the sheet of mineral wool beneath it. The tamper 53 is mounted on a cross bar 55 which works in guide grooves 56 in the sides of frame 37, see Fig. 4. The cross bar 55 is mounted on the lower ends of two adjustable rods 57, each of which has at its upper end ring 58 passing over an eccentric 59 mounted on a cross shaft 60. The shaft 60 is mounted in bearings 61 of outer frame members 62 and is provided near one end with a pulley 63, over which passes a belt 64. At its other end the belt passes over a pulley 65 mounted on the shaft 51 of roller 49. Shaft 51 has also mounted thereon a pulley 66, and a belt 67 passes over this pulley, and a pulley 68 mounted on shaft 31 previously referred to as being driven direct from the transmission device 34. It will thus be seen that as the shaft 60 is rotated, the eccentrics 59 will cause an up and down movement of the tamper 53, through rods 57, and pack the layer of mineral wool beneath it. The rods 57 are made in two parts and are adjustable by the slot and bolt connection as indicated at 69, Fig. 5.

According to my invention, I provide means for cutting the sheet of insulating material passing from under tamper 53 into two or more strips of a desired width. To this end I mount in bearings 70, Fig. 4, provided in outer frame member 62, a cross shaft 71 and on this cross shaft I adjustably mount any desired number of circular knives 72 which, as shown by Fig. 5, are positioned immediately adjacent the turn of belt 44 surrounding the roller 48. Mounted on shaft 71 is a pulley 73, over which passes a belt 74, the other end of which passes over a pulley 75 on shaft 51 of roller 49. The knives 72 are, of course, adjustable on shaft 71 and they can be positioned thereon to secure the proper width of strips of insulating material desired. The cutting action is performed when the sheet of insulating material is carried by the belt 44 into engagement with knives 72 which, rotating in the direction shown in close proximity to belt 44, will cut thru the sheet and the strips thus formed will pass onto a downwardly inclined conveyor belt 76. This belt is mounted at its upper end on a roller 77 having a shaft 78, and at its lower end on a larger roller 79 having a shaft 80. The pulley 77 is located immediately under the knives 72 so that the strips of material as cut will pass directly on to the belt 76. Mounted on shaft 78 is a pulley 110 which is driven from a belt 111 which in turn is driven from a pulley 112 on driven shaft 51.

In one form of the invention indicated in Fig. 1, I mount immediately over the lower pulley 79 a roller 81, having a shaft 82, and as the strips of material are fed down the belt conveyor 76, their lower ends are turned upward and backward by the action of the roller 81, with the result they will be rolled into cylindrical form, and when the roll of each strip has reached the desired diameter, the operator can separate it from the strip by cutting it off with a knife or in any other way.

In another form of the invention shown in Fig. 6, I provide means for mechanically cutting the strip transversely, either to sever the roll from the strip or to cut the strip into blocks or slabs of the desired length. To this end I provide a frame having side members 83 in one end of which, adjacent pulley 79, is mounted a shaft 84 having on one end a pulley 85 for receiving a belt 86 extending from a pulley on the shaft 78 at the upper end of belt 76. Mounted on shaft 84 is a roller 87, over which passes belt 88, the other end of said belt being supported on a pulley 89. Extending centrally between the side frame members 83 are two cross bars 90, the upper surfaces of which are flush with the upper run of belt 88 and which are spaced apart to provide a working slot for a circular cutter 91 mounted on the shaft of a motor 92. The motor 92 is mounted at the lower end of a frame 93 which is supported on rails 94 extending transversely of the belt 88 at a suitable distance above the same and supported on standards 95 mounted on the opposite frame members 83. The belt 88 is guided to pass under the cross bars or cutting blocks 90 by means of guide rollers 96. The frame 93 carrying the circular cutter 91 is adapted to be moved across the support provided by belt 88 either to cut the strips of material from a roll, formed as later described, or to cut the strips into blocks or slabs 97 of a desired length. The frame may be moved by power, but for the sake of simplicity of illustration I have shown, in Fig. 7, a means for manually moving the frame, consisting of a lever mechanism involving a pivoted operating handle 98 and suitable connections 99 therefrom to the frame 93. If desired the frame 83, with its belt conveyor 88 and cutter 91, may be used in forming rolls and cutting off the strips when the rolls have reached the desired diameter. This arrangement is illustrated in Fig. 8 and, as shown, the belt conveyor 88 is inclined downwardly in a manner similar to the belt 76, which is effected by shortening the adjustable legs 100 supporting the outer end of frame 83. To form the roll I mount on a cross shaft 101 a roller 102, which is located above and slightly removed from the vertical plane of the axis of pulley 89. In this arrangement, in operation the cutter frame 93 is held in position at one side of the frame 83 and as the strips move downward on belt 88 their lower ends engage roller 102, which, in a manner similar to the operation of roller 81 previously referred to, operates to turn the ends of the strips upward and backward, and as the strips continue to be advanced, they are rolled up by said rollers into cylindrical form. When the rolls have reached the proper diameter, the frame 93 is then moved crosswise of the strips to cause the cutter 91 to sever them, and is left in this position until the next roll is formed, when it is again moved across the strips in the opposite direction.

The roller 102 is removable, as it would have no purpose when the cutter 91 was being used to form blocks or slabs 97.

It should be stated that the reason for having the belts 76 and 88 downwardly inclined when rolls are being formed is that a more compact roll can be produced than where the strip travels in a horizontal direction, due to the fact that the roll of material is pressed more firmly against the roll-up roller 82 or 102 by the action of gravity, than would otherwise be the case.

Also, the reason for having the gathering belt 6 upwardly inclined is that the fibres projected into the blowing chamber by the blast when striking said belt will adhere thereto with little or no tendency to roll, as would be the case if the gathering belt were horizontal.

While I have illustrated the best embodiment of my invention now known to me, I wish it understood that the drawings are to be taken as illustrative of the broad idea of my invention, as it will be obvious that various changes in the form, construction and operation of parts shown could be made without departing from the broad idea of my invention, as outlined in the following claims.

I claim:—

1. In combination with a cupola for melting rock, or other material, for forming mineral wool fibres, a blowing chamber positioned to receive the mineral wool fibres formed by a blast projected against the molten mass flowing from said cupola, a dampered pipe connecting the upper part of said cupola with said blowing chamber for conveying heat from the cupola into said blowing chamber, and a ventilator in said blowing chamber.

2. In combination with a blowing chamber for receiving mineral wool fibres as formed by a blast, an endless gathering belt extending substantially from end to end of said chamber and continuously rotated to remove the layer of mineral wool fibres deposited thereon from said chamber, means located beyond the delivery end of said gathering belt for progressively reducing the thickness of the layer of mineral wool passing from said belt, a supported endless conveyor for moving the layer of mineral wool under said reducing means, a downwardly inclined endless conveyor having its upper end positioned to receive the layer of mineral wool passing from said first named endless conveyor and a roller located at the bottom of said inclined conveyor and rotated, as to its underside, in a direction opposed to the direction of movement of the layer of mineral wool whereby to cause the latter to be rolled up into cylindrical form as it is moved downward by said second endless conveyor.

3. The method which consists in continuously depositing in a blowing chamber mineral wool fibres blown from two cupolas by blasts directed at angles converging at a common zone within said blowing chamber.

4. The method which consists in continuously depositing upon a movable support within an enclosure, to form a layer on said support, mineral wool fibres blown from two cupolas by blasts directed at angles converging at a common zone within said enclosure, and in continuation of the movement progressively reducing the thickness of said layer, and packing and compressing the same.

In testimony whereof, I have hereunto set my hand.

OLIVER F. MOTTWEILER.